United States Patent
Acharya

(12) 
(10) Patent No.: US 6,925,077 B1
(45) Date of Patent: Aug. 2, 2005

(54) SYSTEM AND METHOD FOR INTERFACING BETWEEN A MEDIA ACCESS CONTROLLER AND A NUMBER OF PHYSICAL LAYER DEVICES USING TIME DIVISION MULTIPLEXING

(75) Inventor: Yatin R. Acharya, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 858 days.

(21) Appl. No.: 09/593,912

(22) Filed: Jun. 14, 2000

(51) Int. Cl.[7] .............................................. H04L 12/00
(52) U.S. Cl. ...................................... 370/362; 370/458
(58) Field of Search ................................ 370/360, 362, 370/400, 402, 403, 404, 405, 422, 423, 424, 445, 447, 458, 460, 461, 462, 463

(56) References Cited

U.S. PATENT DOCUMENTS

| | | | |
|---|---|---|---|
| 5,493,571 A | * 2/1996 | Engdahl et al. | ............ 370/514 |
| 5,764,895 A | * 6/1998 | Chung | ........................ 709/250 |
| 5,790,786 A | * 8/1998 | Wakeman et al. | .......... 709/249 |
| 5,809,026 A | * 9/1998 | Wong et al. | ................ 370/445 |
| 6,012,099 A | * 1/2000 | Chung | ........................ 709/249 |
| 6,122,667 A | * 9/2000 | Chung | ........................ 709/228 |
| 6,130,891 A | * 10/2000 | Lam et al. | ................... 370/401 |
| 6,577,631 B1 | * 6/2003 | Keenan et al. | .............. 370/394 |
| 6,650,624 B1 | * 11/2003 | Quigley et al. | ............. 370/252 |

OTHER PUBLICATIONS

IEEE Std 802.3u–1995, American National Standard, IEEE Standards for Local and Metropolitan Area Networks, pp. 1–16, 27–80.

* cited by examiner

*Primary Examiner*—Kwang Bin Yao
(74) *Attorney, Agent, or Firm*—Renner, Otto, Boisselle & Sklar, LLP

(57) ABSTRACT

A system and method are provided in a media access controller for communicating to a number of physical layer devices. The system includes a common bus port for electrical coupling to a common bus that is electrically coupled to each one of the physical layer devices in communication with the media access controller. The system also includes logical circuitry to transmit a training sequence from the common bus port to the physical layer devices. Finally, the system includes logical circuitry to transmit a data block from the common bus port to a respective one of the physical layer devices by way of the common bus, the data block being transmitted in one of a number of time slots of a time division multiplexed transmission. A system and method are also provided in the physical layer devices to receive data from the media access controller.

26 Claims, 5 Drawing Sheets

SYSTEM AND METHOD FOR INTERFACING BETWEEN A MEDIA ACCESS CONTROLLER AND A NUMBER OF PHYSICAL LAYER DEVICES USING TIME DIVISION MULTIPLEXING

TECHNICAL FIELD

The present invention is generally related to data communications and, more particularly, is related to a system and method for interfacing between a single media access control to a number of physical layer devices.

BACKGROUND OF THE INVENTION

In the field of data communications, there are many types of networks that facilitate the transfer of data from one location to another. Some exemplary standards include Ethernet, E.25, Frame Relay, and Asynchronous Transfer Mode. Generally these standards are available from standards bodies such as the Institute of Electrical and Electronics Engineers (IEEE) and other organizations. The standards generally describe how the data is to be packaged and then transported across the particular network and also provide for error checking and other aspects of data transmission as they relate to the particular standard in question.

With particular focus to Ethernet networks, the standards that guide the creation and operation thereof include the IEEE Std 802.3-1995, the entire text of which is incorporated herein by reference. The IEEE Std 802.3-1995 generally discusses Ethernet networks as they relate to the Data Link and Physical layers of the International Organization for Standardization Open Systems Interconnection (ISO/OSI) Reference Model which is well known by those skilled in the art.

In the Physical and Data Link layers, the IEEE Std 802.3-1995 particularly discusses the specifications and operation of the Media Access Control (MAC) of the Data Link layer and the physical layer devices (PHYs) of the Physical layer. Also, the particular interconnection between the media access controllers and the physical layer devices is discussed, referred to as a Media Independent Interface (MII). As discussed in IEEE Std 802.3-1995, the MII may assume one of three following forms, including an integrated circuit to integrated circuit interface with traces on a printed circuit board, a motherboard to daughterboard interface between two or more circuit boards, or an interface between two printed circuit assemblies that are attached with a length of cable and an appropriate connector.

The data transfer accomplished with the MIII as specified by IEEE Std 802.3-1995 provides for bi-directional data transfer. In each direction, the MII specifies a four bit bundle of conductors to transfer four bits of data or a single nibble in a four bit parallel data transfer. Also, the MII includes a transmit enable (TX_EN) conductor in each direction that provides a pathway for a TX_EN signal indicating that the nibbles are being presented on the MII for transmission. The IEEE Std 802.3-1995 also specifies that a single MII is to be employed between a media access controller and a respective physical layer device with which the media access controller communicates. Unfortunately, this requires a number of input and output pins to accommodate the MII interface between each media access controller and its associated physical layer device given that a single chip includes a number of media access controllers. This results in a significant number of pins that places a limit on the number of media access controllers within a specific integrated circuit due to size limitations as well as resulting in real estate problems on the integrated circuit itself.

SUMMARY OF THE INVENTION

In light of the foregoing, the present invention provides for a system and method in a media access controller for communicating to a number of physical layer devices. In this regard, the system includes a common bus port for electrical coupling to a common bus that is electrically coupled to each one of the physical layer devices in communication with the media access controller. The system also includes logical circuitry to transmit a training sequence from the common bus port to the physical layer devices. Finally, the system includes logical circuitry to transmit a data block from the common bus port to a respective one of the physical layer devices by way of the common bus, the data block being transmitted in one of a number of time slots of a time division multiplexed transmission.

The present invention may also be viewed as a method in a media access controller for communicating to a number of physical layer devices. The method comprises the steps of transmitting a training sequence to the physical layer devices by way of a common bus, and transmitting a data block to a respective one of the physical layer devices by way of the common bus, the data block being transmitted in one of a number of time slots of a time division multiplexed (TDM) transmission.

With respect to each one of the physical layer devices, the present invention provides a system and method in each of the physical layer devices to receive data from the media access controller. According to this system, a common bus input port for electrical coupling to a common bus that is electrically coupled to a number of physical layer devices and the media access controller is provided. Also, each of the physical layer devices includes logical circuitry to maintain an address designation associated with the physical layer device and logical circuitry to synchronize with a time slot dedicated to the physical layer device, the time slot appearing in a time division multiplexed transmission received through the common bus port. Finally, the system includes logical circuitry to receive a data block transmitted through the time slot.

The system in the physical layer devices may also be viewed as a method to receive data from a media access controller. In this regard, the method comprises the steps of: maintaining an address designation associated with the physical layer device; synchronizing with a time slot dedicated to the physical layer device, the time slot appearing in a time division multiplexed transmission received through the common bus port; and, receiving a data block transmitted through the time slot.

Other features and advantages of the present invention will become apparent to one with skill in the art upon examination of the following drawings and detailed description. It is intended that all such additional features and advantages be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
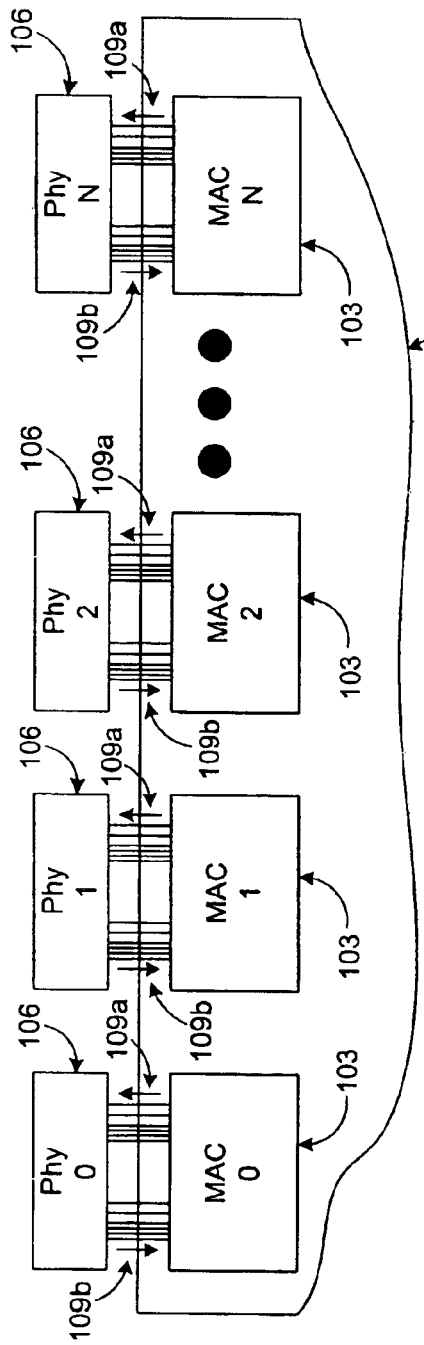
FIG. 1 is a block diagram of an integrated switching circuit that comprises a number of media access controllers according to the prior art.

With reference to FIG. 1, shown is an integrated switching circuit 100 according to the prior art. The integrated switching circuit 100 includes a number of media access controllers (MACs) 103, each of the media access controllers 103 being in electrical communication with a physical layer device 106. Communication between the respective physical layer devices 106 and the media access controllers 103 is established across a number of conductors 109a and 109b that make up the physical portion of a media independent interface as set forth by the standards in the IEEE Std 802.3-1995. According to IEEE Std 802.3-1995, there are a number of conductors 109a and 109b between each of the media access controllers 103 and their respective physical layer devices 106 that are employed to establish bi-directional data communication, error indication, and other aspects of the media independent interface.

Figure 2:
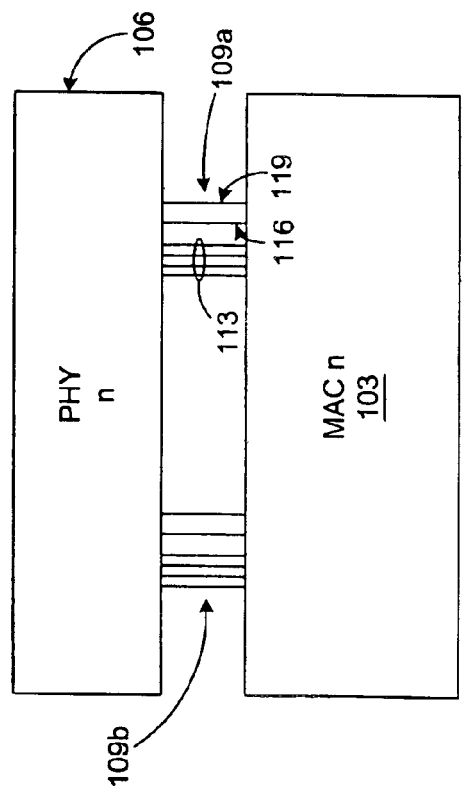
FIG. 2 is a block diagram of a single media access controller with its associated physical layer device according to the prior art.

Turning then to FIG. 2, shown is a close up view of a media access controller 103 and its associated physical layer device 106 according to the prior art. Note that the conductors 109a that are used for communication from the media access controller 103 to the physical layer device 106 include four data lines 113, a transmit enable line 116, and a clock line 119. The conductors 109b are used for communication from the physical layer device 106 to the media access controller 103. It is understood that there are other conductors 109a between the media access controller 103 and each physical layer device 106 as set forth in IEEE Std 802.3-1995, however, only the data lines 113, transmit enable line 116, and the clock line 119 are shown in FIG. 2 as they are particularly pertinent to the discussion of the present invention.

Figure 3:
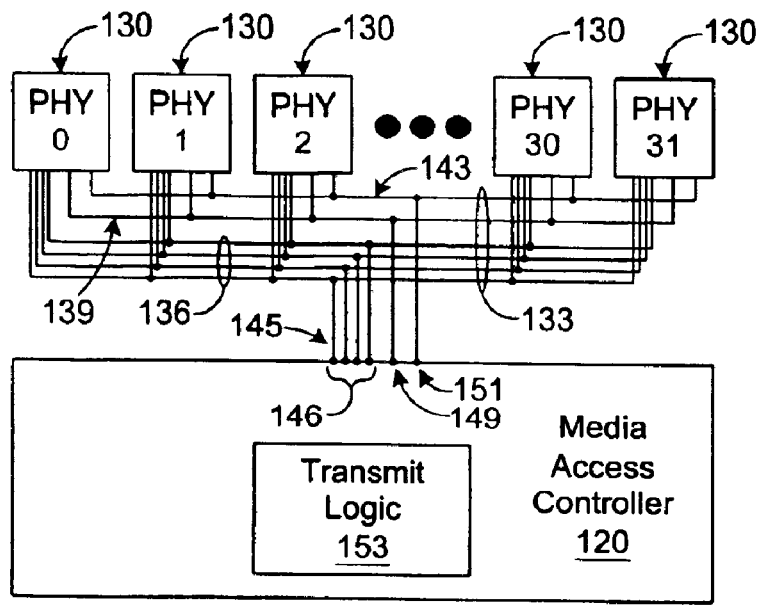
FIG. 3 is a block diagram of a media access controller according to an embodiment of the present invention.

Turning to FIG. 3, shown is a media access controller 120 with its associated physical layer devices 130 according to an embodiment of the present invention. Between the media access controller 120 and the physical layer devices 130 is a common bus 133. The common bus 133 is electrically coupled between the media access controller 120 and each one of the physical layer devices 130. The common bus 133 includes a number of parallel data lines 136, a transmit enable line 139, and a clock line 143. The media access controller 120 further comprises a common bus port 145 that includes a parallel data port 146, an enable port 149, and a clock port 151 that are electrically coupled to the parallel data lines 136, the transmit enable line 139, and the clock line 143, respectively. The electrical coupling may comprise, for example, a pin connection on an integrated circuit, etc., a plug-in connection, or a connection between devices in a single integrated circuit. Thus, the ports 146, 149, and 151 define the points at which electrical signals enter or leave the media access controller 120 to and from the common bus 133. Also, located within the media access controller 120 is transmit logic 153. The transmit logic 153 facilitates the data communication between the media access controller 120 and the individual physical layer devices 130 from the perspective of the media access controller 120.

Figure 4:
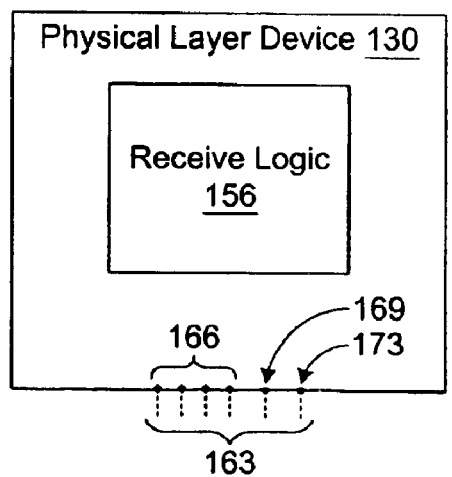
FIG. 4 is a block diagram of a physical layer device communicating with the media access controller of FIG. 3 according to another embodiment of the present invention.

With reference to FIG. 4, shown is a physical layer device 130 according to the present invention. Each of the physical layer devices 130 includes receive logic 156 that facilitates data communication with the media access controller 120. Each of the physical layer devices 130 also includes a common bus port 163 that comprises a four bit parallel data port 166, although it is understood that a greater or lesser number of bits may be employed. The common bus port 163 also includes an enable port 169 and a clock port 173. The parallel data port 166, enable port 169, and clock port 173 are electrically coupled to the parallel data lines 136, enable line 139, and clock line 143 of the common bus 133. The ports 166, 169, and 173 define the points at which electrical signals enter or leave the physical layer devices 130 to and from the common bus 133.

It is understood that each of the physical layer devices 130 may further comprise output ports and input ports to communicate with physical components other than the media access controller 120, where each physical layer device 130 acts as a link in the chain of a particular data communications path to and from a network (see IEEE Std 802.3-1995) as is known in the art.

Referring again to FIGS. 3 and 4, a general description of the interface between the media access controller 120 and the associated physical layer devices 130 is provided. The media access controller 120 communicates with the physical layer devices 130 be executing the transmit logic 153. The transmit logic 153 facilitates the communication from the media access controller 120 to each one of the physical layer devices 130 employing a time division multiplexed transmission scheme. To begin, the transmit logic 153 causes a training sequence to be transmitted onto the common bus 133 to all of the physical layer devices 130.

The training sequence includes a number of address designations that have been assigned to each one of the physical layer devices 130. Each address designation is transmitted in one of the time slots of the time division multiplex transmission. In each one of the physical layer devices 130, the receive logic 156 stores the particular address designation assigned thereto. While the training sequence is transmitted, each of the physical layer devices 130 identifies its dedicated time slot by identifying the time slot that contains the transmitted address designation that matches its stored address designation.

The training sequence is transmitted for an appropriate period of time that allows each of the physical layer devices 130 to identify its particular time slot. Thereafter, data is transmitted to the respective physical layer devices 130 through the appropriate time slots dedicated thereto. In this manner, a data block is transmitted from the media access controller 120 to any particular physical layer device 130. The transmit 153 indicates the transmission of either the training sequence or data to the physical layer devices 130 by transmitting an appropriate transmit enable signal to each of the physical layer devices 130 by way of the enable line 139 through the enable port 149 as will be discussed.

Figure 5A:
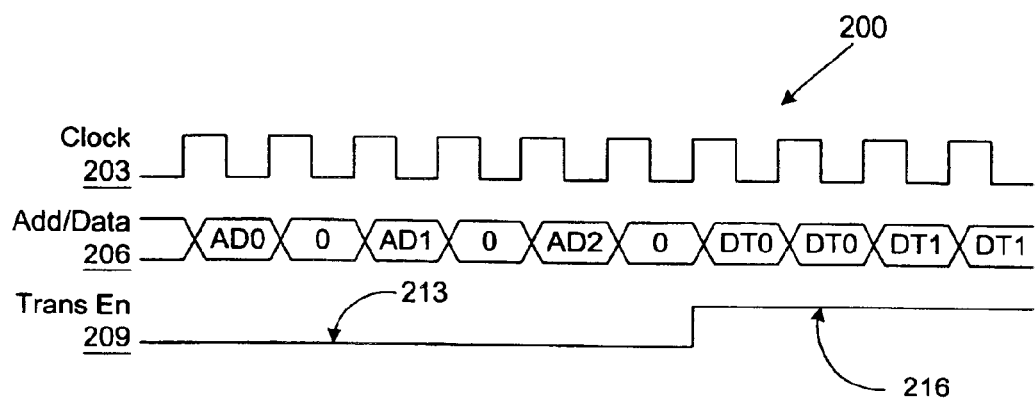
FIG. 5A is a timing diagram of the operation of the transmit logic in the media access controller of FIG. 3.

With reference to FIG. 5A, shown is a timing diagram 200 that illustrates the signals and data that are transmitted relative to a clock signal 203 by the transmit logic 153 (FIG. 3) onto the common bus 133 (FIG. 3) through the common bus ports 145 (FIG. 3). The timing diagram 200 includes a clock signal 203 that may generated by a system clock and is applied to the clock line 143 that routes the clock signal 203 to the media access controller 120 (FIG. 3) and the physical layer devices 130 (FIG. 3). Alternatively, the clock signal 203 may be generated within the media access controller 120 or within one of the physical layer devices 130. The timing diagram 200 further comprises an address/data signal 206 that shows a number of nibbles (4 bits wide).

The nibbles include address designations AD0-N and data nibbles DT0-N that are transmitted on the parallel data bus 136. Each nibble of data and/or address designation information is transmitted during a single cycle of the clock signal 203. The timing diagram 200 also includes a transmit enable signal 209 with an inactive state 213 and an active state 216. When the transmit enable signal 209 is in the inactive state 213, the address data signal 206 comprises the training sequence that is transmitted to each one of the physical layer devices 130 in order that they may identify the appropriate time slot within which they are to receive data from the media access controller 120.

As shown, the time slots are 2 nibbles wide, although the time slots may include a greater or lesser number of nibbles. In the case of the 2 nibble configuration, there are 8 bits of information that may be transmitted in each time slot that the transmit logic 153 can use to inform each physical layer device 130 of its designated time slot during training.

As shown in the timing diagram 200, the address designations AD0-N are 4 bits wide and occupy the first nibble in each time slot. The remaining nibble in each time slot is filled with zeros, or any other predefined binary logic sequence. Although the address designations AD0-N are shown as a single nibble in length, it may be possible that 5 or 6 nibbles can be used as well, so long as there are enough data nibbles left over within each time slot to send a predefined sequence of binary numbers. This predefined sequence of binary numbers allows the receive logic 156 within each one of the physical layer devices 130 to identify the particular address information associated with each time slot. If the address designations took up the entire two time slots, then the particular time slots would be indistinguishable during training, and the physical access devices 130 would be unable to identify their dedicated time slots. Thus, ultimately the number of digits in the binary sequence in each time slot that fills in the remaining space not used by the address designations AD0-N indicates to the physical layer devices 130 where each transmitted address designation AD0-N begins and ends accordingly. The receive logic 156 in the physical layer devices 130 then scrutinizes the address designations AD0-N for a match with an address designation stored within each one of the physical layer devices 130.

Once a particular physical layer devices 130 detects a match, it then knows that its dedicated time slot is the one in which the address designation AD0-N has appeared. The training sequence is continued for a predetermined period of time until it is assured that each physical layer device 130 has identified its particular slot in the time division multiplexed transmission. Thereafter, the transmit enable signal 209 is placed in an active state 216 to indicate an existence of data within the time slots as opposed to the training sequence. Thereafter, whenever a data block is to be transmitted from the media access controller 120 to a particular one of the physical layer devices 130, the data is transmitted as the data nibbles DT0-N in the appropriate time slot dedicated to that particular physical layer device 130 by the transmit logic 153. The receive logic 156 in each of the physical layer devices 130 receives the data that is transmitted in the dedicated time slot to pass it one to an appropriate network, etc. Note that the address/data signal 206 does not show all of the time slots for the training sequence as well as all of the time slots in which the data nibbles DT0-N is transmitted, where only a few of each is shown for purposes of illustration of the present invention.

Figure 5B:
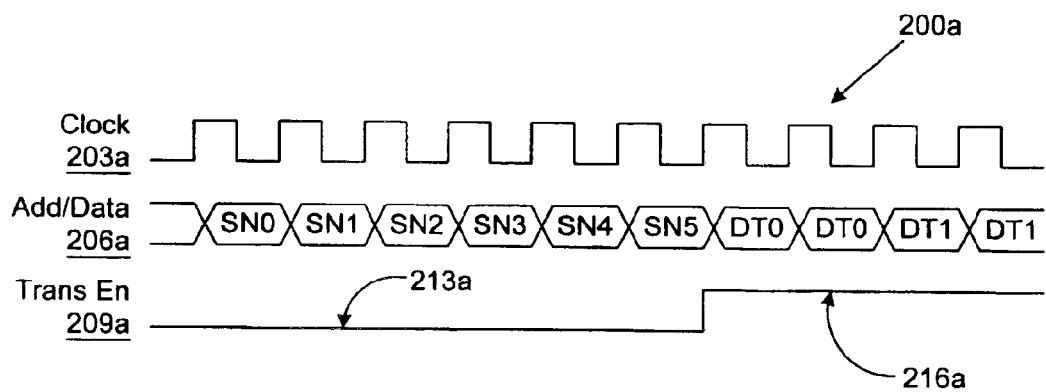
FIG. 5B is a timing diagram of the operation of the transmit logic in the media access controller of FIG. 3 according to another embodiment of the present invention.

Turning to FIG. 5B, shown is a timing diagram 200a that details an alternative communications protocol between the media access controller 120 and the physical layer devices 130 according to another embodiment of the present invention. The timing diagram 200a includes a clock signal 203a that is substantially similar to the clock signal 203 (FIG. 5A). Also, the transmit enable signal 209a includes an inactive state 213a and an active state 216a as shown. The timing diagram 200a also includes an address/data signal 206a that is transmitted by way of the parallel data lines 136.

To initialize the communication between the media access controller 120 and the physical layer devices 130, a predefined training sequence that comprises several sequence nibbles SN0-N is transmitted while the transmit enable signal 209a is maintained in the inactive state 213a. Although only 5 nibbles SN0-5 are shown, it is understood that the predefined training sequence may comprise any number of nibbles. The beginning of the first time slot in which data is transmitted to the first one of the physical layer devices 130 is marked by the end of the predefined sequence. That is to say, the first nibble of the first time slot occurs after the last nibble of the predefined training sequence.

The receive logic 156 (FIG. 4) in each physical layer device 130 detects an occurrence of the predefined sequence when the transmit enable signal 209a is in the inactive state 213a and is thus provided with a reference from which its particular time slot for data communication can be determined.

Figure 6:
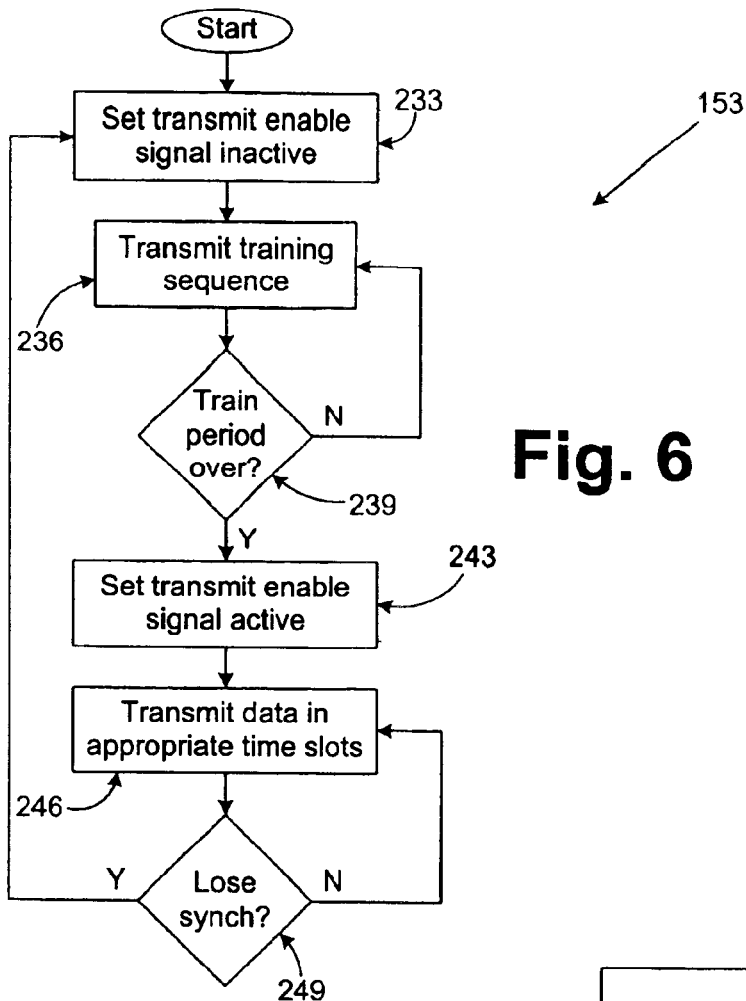
FIG. 6 is a flowchart of transmit logic within the media access controller of FIG. 3.

With reference to FIG. 6, shown is the transmit logic 153 that is employed in the media access controller 120 to transmit the data to the physical layer devices 130 (FIG. 3) according to the timing diagram 200 (FIG. 5A). The transmit logic 153 is preferably implemented with dedicated logically circuitry for speed and efficiency. However, it is also contemplated that the transmit logic 153 may be implemented in terms of software executable by a processor circuit as will be discussed. The transmit logic 153 is executed by the media access controller 120 (FIG. 3) to transmit a particular data block to any one of the physical layer devices 130 by way of a time division multiplex transmission as discussed previously. Beginning with data block 233, the transmit enable signal 209 (FIG. 5A) is set to the inactive state 213 (FIG. 5A) as it is applied through the enable port 149 (FIG. 3) onto the enable line 139 (FIG. 3). Thereafter, the transmit logic progresses to block 236 in which the training sequence is transmitted through the parallel data port 146 (FIG. 3)

onto the parallel data lines 136 (FIG. 3). Then, in block 239 it is determined whether the training period that comprises a predefined period of time is completed. If such is the case, then the transmit logic 153 moves on to block 243. Otherwise, the transmit logic 153 reverts back to block 236 to continue transmitting the training sequence.

In block 243, the transmit enable signal 209 is set to the active state 216 (FIG. 5A) and is applied to the physical layer devices 130 through the enable port 149 to the enable line 136. The active transmit enable signal 209 indicates to the physical layer devices 130 that the data nibbles transmitted across the parallel data lines 136 make up various data blocks transmitted in their appropriate time slots assigned to the respective physical layer devices 130. The receive logic 156 (FIG. 4) in each of the physical layer devices 130 acquires the data nibbles that appear within the time slot that has been assigned thereto. In block 246 then, the transmit logic 153 transmits the data nibbles through the parallel data port 146 onto the data lines 136 in the appropriate time slots to the respective physical layer devices 130. Thereafter, in block 249 if it is determined that synchronization has been lost with any one of the physical layer devices 130, then the transmit logic 153 reverts back to block 233. Otherwise, the transmit logic reverts back to block 246 where data transmission to the respective physical layer devices is continued. A loss of synchronization may be determined, for example, based upon data received by the media access controller 120 from one of the physical layer devices 130.

Figure 7:
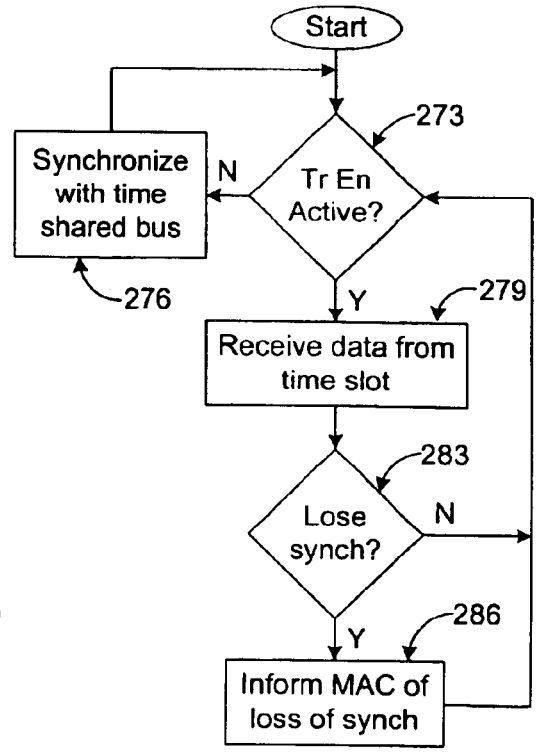
FIG. 7 is a flowchart of receive logic within the physical layer device of FIG. 4.

With reference to FIG. 7, shown is a flow chart of the receive logic 156 according to another aspect of the present invention. The receive logic 156 is preferably implemented with dedicated logical circuitry for speed and efficiency. However, it is also contemplated that the receive logic 156 may be implemented in terms of software executable by a processor circuit as will be discussed. The receive logic 156 is executed by the physical layer devices 130 (FIG. 4) to both synchronize with the time division multiplexed transmission from the media access controller 120 by appropriate training, and, to receive one or more data from the access controller 120 in the appropriate time slot dedicated to the particular physical layer devices 130. Beginning with block 273, the receive logic 156 determines whether the transmit enable signal 209 (FIG. 5A) is in the active state 216 (FIG. 5A). If not, then the receive logic 156 moves to block 276 in which each of the physical layer devices 130 determines which time slot is reserved from themselves from the time division multiplexed transmission from the media access controller 120 by examining the training sequence transmitted from the media access controller 120.

In particular, in determining a particular reserved time slot, the receive logic 156 maintains an address designation that uniquely defines the respective physical layer device 130. The address designation within the receive logic 156 is compared to the address designations transmitted in address/data signal 206 (FIG. 5A) until a match is found. The time slot in which the matching address designation transmitted from the media access controller 120 appears is deemed the time slot dedicated to the respective physical layer devices 130. Thereafter, the physical layer devices 130 maintains the position of the time slot dedicated to itself to receive nibbles of the data blocks that will follow.

Assuming that the transmit enable signal 209 is in the active state 216 in block 273, the receive logic 156 moves to block 279 in which data is received from the media access controller 120 through the particular time slot. Thereafter, in block 283, the receive logic 156 determines whether it has lost synchronization with the media access controller 120 such that it can no longer determine where its particular time slot exists. If in block 283, synchronization has not been lost, then the receive logic 156 reverts back to block 273. Otherwise the receive logic 156 progresses to block 286 in which it informs the media access controller 120 of the loss of synchronization through an appropriate return channel between the physical layer devices 130 and the access controller 120. Thereafter, the receive logic 156 reverts back to block 273.

Referring back to FIG. 3, the present invention also includes a return path common bus in addition to the common bus 133 to facilitate data communication from each one of the physical layer devices 130 to the media access controller 130. The return path common bus employed for communication as such is substantially similar to the common bus 133. In this regard, each physical layer device 130 transmits a data block in the form of data nibbles to the media access controller 120 using a dedicated time slot that corresponds in time with the time slot used to communicate from the media access controller 120 to the respective physical layer device 130. The time slots on the return path common bus are determined relative to the clock signal 203 (FIG. 5). Consequently, once each physical layer device 130 identifies the time slot through which it receives data from the media access controller 120 through the common bus 133 as discussed above, it then knows its corresponding time slot in which to transmit data to the media access controller 120 by way of the return path common bus.

In addition, the present invention generally applies to any interface between a media access controller of the data link layer and a physical layer device of the physical layer. In this regard, the present invention applies without limitation to any media access controller and physical layer device regardless of attributes such as bit rate or other characteristics.

Figure 8:
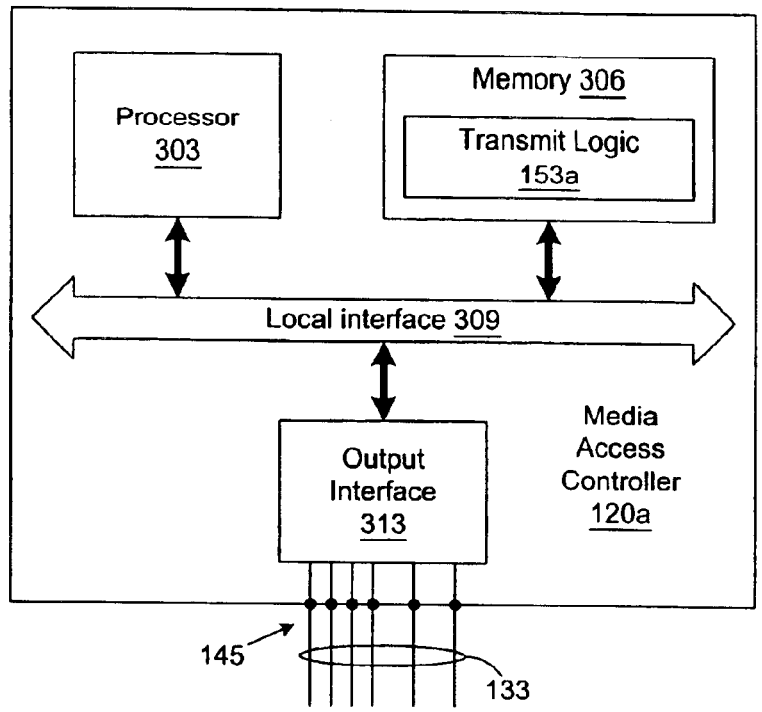
FIG. 8 is a block diagram of a media access controller that includes a software implementation of the transmit logic of FIG. 6.

With reference to FIG. 8, shown is a media access controller 120a according to another embodiment of the present invention that illustrates a software implementation of the transmit logic 153 (FIG. 6), denoted transmit logic 153a. The media access controller 120a includes a processor 303 and a memory 306, both of which are coupled to a local interface 309. The local interface may comprise, for example, a data bus with an accompanying control bus, etc. The media access controller 120a further includes an output interface 313 that provides a link between the local interface 309 and the common bus 133. The output interface 313 includes a common bus port 145 as discussed with respect to the media access controller 120 (FIG. 3). In the case of the media access controller 120a, the transmit logic 153a is stored on the memory 306 and is executable by the processor 303. The processor 303 need not be dedicated to execute the transmit logic 153a, where the transmit logic 153a may be implemented in conjunction with other logic or applications that are stored in the memory 306. Note that the media access controller 120a stores the address designations of all the physical layer devices 130 (FIG. 3) in the memory 306 so that the address designations may be generated by the transmit logic 153a to transmit within the training sequence to the physical layer devices 130.

Figure 9:
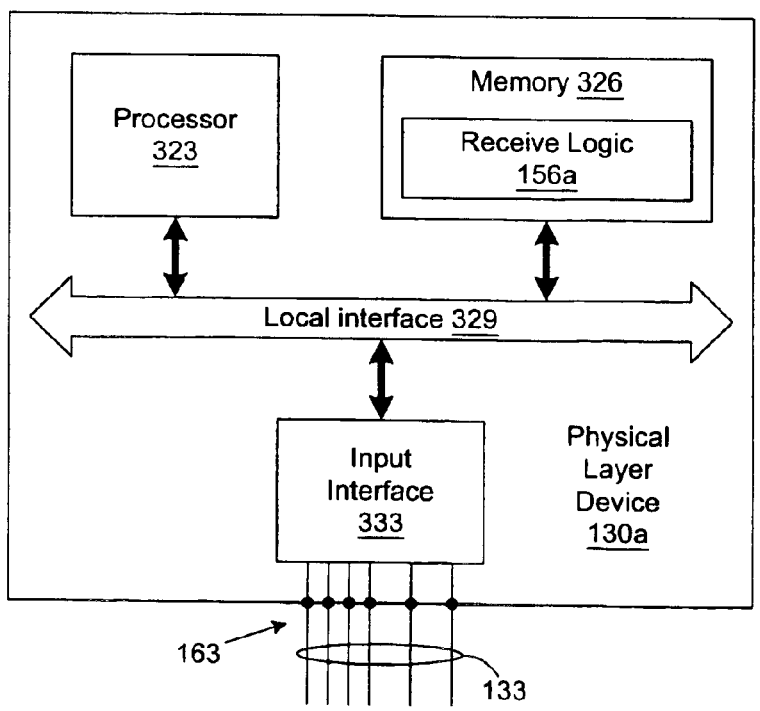
FIG. 9 is a block diagram of a media access controller that includes a software implementation of the receive logic of FIG. 7.

With reference to FIG. 9, shown is a physical layer devices 130a according to another embodiment of the present invention that illustrates a software implementation of the receive logic 156 (FIG. 7), denoted receive logic 156a. Each of the physical layer devices 130a includes a processor 323 and a memory 326, both of which are coupled to a local interface 329. The local interface 329 may comprise, for example, a data bus with an accompanying control bus, etc. Each of the physical layer devices 130*a* further includes an input interface 333 that provides a link between the local interface 329 and the common bus 133. The input interface 333 includes a common bus port 163 as discussed with respect to the physical layer devices 130 (FIG. 4). In the case of the physical layer devices 130*a*, the transmit logic 156*a* is stored on the memory 326 and is executable by the processor 323. The processor 323 need not be dedicated to execute the receive logic 156*a*, where the receive logic 156*a* may be implemented in conjunction with other logic or applications that are stored in the memory 326.

The memories 306 and 326 include both volatile and nonvolatile memory components. Volatile components are those that do not retain data values upon loss of power. Conversely, nonvolatile components retain data upon a loss of power. Thus, the memories 306 and 326 may comprise, for example, random access memory (RAM), read-only memory (ROM), hard disk drives, floppy disk drives, compact disk drives, tape drives, and/or other memory components, or a combination of any two or more of these memory components.

If embodied in hardware, the transmit and receive logic 153 and 156, and all other logic discussed herein, can be implemented as a circuit or state machine that employs any one or a combination of technologies, including but not limited to, discrete logic circuits having logic gates for implementing various logic functions upon an application of one or more data signals, an application specific integrated circuit having appropriate logic gates, a programmable gate array(s) (PGA), a field programmable gate array (FPGA), or other components, etc. Such technologies are generally well known by those skilled in the art and, consequently, are not described in detail herein.

The flow charts of FIGS. 6 and 7 show the architecture, functionality, and operation of an implementation of the logic 153 (FIG. 6) and 156 (FIG. 7). If embodied in software, each block may represent a module, segment, or portion of code that comprises one or more executable instructions to implement the specified logical function(s). If embodied in hardware, each block may represent a circuit or a number of interconnected circuits to implement the specified logical function(s). Although the flow charts of FIGS. 6 and 7 show a specific order of execution, it is understood that the order of execution may differ from that which is depicted. For example, the order of execution of two or more blocks may be scrambled relative to the order shown. Also, two or more blocks shown in succession in FIGS. 6 and 7 may be executed concurrently or with partial concurrence. It is understood that all such variations are within the scope of the present invention.

Also, transmit and receive logic 153 and 156, and all other logic discussed herein, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples of the computer-readable medium would include, but are not limited to, the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium then compiled, interpreted or otherwise processed in a suitable manner if necessary, and then stored in a computer memory.

Many variations and modifications may be made to the above-described embodiment(s) of the invention without departing substantially from the spirit and principles of the invention. All such modifications and variations are intended to be included herein within the scope of the present invention.

What is claimed is:

1. A system in a media access controller for communicating to a number of physical layer devices, comprising:
   a common bus port for electrical coupling to a common bus that is electrically coupled to the physical layer devices, the common bus serving as a direct interface between the media access controller and the physical layer devices;
   logical circuitry to transmit a training sequence from the common bus port to the physical layer devices; and
   logical circuitry to transmit a data block from the common bus port to a respective one of the physical layer devices by way of the common bus, the data block being transmitted in one of a number of time slots of a time division multiplexed transmission.

2. The system of claim 1, wherein the logical circuitry to transmit a training sequence from the common bus port further comprises logical circuitry to transmit a transmit enable signal from the common bus port simultaneously with the data block, thereby indicating a transmission of the data block to the physical layer devices.

3. The system of claim 1, wherein the logical circuitry to transmit a training sequence from the common bus port to the physical layer devices further comprises logical circuitry to transmit an address designation in each of the time slots.

4. The system of claim 3, wherein each of the address designations is transmitted in a first portion of the corresponding time slot.

5. The system of claim 4, wherein a predetermined sequence is transmitted in a second portion of the corresponding time slot.

6. The system of claim 1, wherein the logical circuitry to transmit a training sequence from the common bus port to the physical layer devices further comprises logical circuitry to transmit a predefined training sequence that provides a reference for the time slots.

7. The system of claim 1, wherein the electrical coupling includes a pin connection on an integrated circuit.

8. The system of claim 1, wherein the electrical coupling includes a plug-in connection on an integrated circuit.

9. The system of claim 1, wherein the electrical coupling includes a pin connection between the media access controller and the physical layer devices in a single integrated circuit.

10. A system in a media access controller for communicating to a number of physical layer devices, comprising:
    a processor coupled to a local interface;

a memory coupled to the local interface;

a common bus port coupled to the local interface, the common bus port being adapted for electrical coupling to a common bus that is electrically coupled to the number of physical layer devices, the common bus serving as a direct interface between the media access controller and the physical layer devices; and operating logic stored on the memory and executable by the processor, the operating logic further comprising:

logic to transmit a training sequence from the common bus port to the physical layer devices; and logic to transmit a data block from the common bus port to a respective one of the physical layer devices by way of the common bus, the data block being transmitted in one of a number of time slots of a time division multiplexed (TDM) transmission.

11. The system of claim 10, wherein the logic to transmit a training sequence from the common bus port to the physical layer devices further comprises logic to transmit a transmit enable signal from the common bus port simultaneously with the data block, thereby indicating a transmission of the data block to the physical layer devices.

12. The system of claim 10, wherein the logic to transmit a training sequence from the common bus port to the physical layer devices further comprises logic to transmit an address designation in each of the time slots.

13. The system of claim 10, wherein the logic to transmit a training sequence from the common bus port to the physical layer devices further comprises logic to transmit a predefined training sequence that provides a reference for the times slots.

14. The system of claim 13, wherein each of the address designations is transmitted in a first portion of the corresponding time slot.

15. The system of claim 13, wherein a predetermined sequence is transmitted in a second portion of the corresponding time slot.

16. The system of claim 10, wherein the electrical coupling includes a connection on an integrated circuit.

17. The system of claim 10, wherein the electrical coupling includes a plug-in connection on an integrated circuit.

18. The system of claim 10, wherein the electrical coupling includes a connection between the media access controller and the physical layer devices in a single integrated circuit.

19. A system in a media access controller for communicating to a number of physical layer devices, comprising:

a common bus port coupled to the local interface, the common bus port being adapted for electrical coupling to a common bus that is electrically coupled to the number of physical layer devices, the common bus serving as a direct interface between the media access controller and the physical layer devices;

means for transmitting a training sequence from the common bus port to the physical layer devices; and means for transmitting a data block from the common bus port to a respective one of the physical layer devices by way of the common bus, the data block being transmitted in one of a number of time slots of a time division multiplexed (TDM) transmission.

20. The system of claim 19, wherein the means for transmitting a training sequence from the common bus port to the physical layer devices further comprises means for transmitting a transmit enable signal from the common bus port simultaneously with the data block, thereby indicating a transmission of the data block to the physical layer devices.

21. The system of claim 19, wherein the means for transmitting a training sequence from the common bus port to the physical layer devices further comprises means for transmitting an address designation in each of the time slots.

22. The system of claim 19, wherein the electrical coupling includes at least one of a pin connection on an integrated circuit, a plug-in connection on an integrated circuit and a connection between the media access controller and the physical layer devices in a single integrated circuit.

23. A method in a media access controller for communicating to a number of physical layer devices, comprising the steps of:

transmitting a training sequence to the physical layer devices by way of a common bus, the common bus serving as a direct interface between the media access controller and the physical layer devices; and transmitting a data block to a respective one of the physical layer devices by way of the common bus, the data block being transmitted in one of a number of time slots of a time division multiplexed (TDM) transmission.

24. The method of claim 23, wherein the step of transmitting a training sequence to the physical layer devices by way of a common bus further comprises the step of transmitting a transmit enable signal to the physical layer devices by way of the common bus simultaneously with the transmission of the data block, thereby indicating a transmission of the data block to the physical layer devices.

25. The method of claim 23, wherein the step of transmitting a training sequence to the physical layer devices by way of a common bus further comprises the step of transmitting an address designation in each of the time slots.

26. The system of claim 23, wherein the electrical coupling includes at least one of a pin connection on an integrated circuit, a plug-in connection on an integrated circuit and a connection between the media access controller and the physical layer devices in a single integrated circuit.

* * * * *

UNITED STATES PATENT AND TRADEMARK OFFICE
CERTIFICATE OF CORRECTION

PATENT NO. : 6,925,077 B1
DATED : August 2, 2005
INVENTOR(S) : Yatin R. Acharya

It is certified that error appears in the above-identified patent and that said Letters Patent is hereby corrected as shown below:

Column 1,
Line 50, replace "MIII" with -- MII --.

Column 5,
Line 5, replace "The transmit 153" with -- The transmit logic 153 --.

Column 6,
Line 4, replace "particular slot" with -- particular time slot --.

Column 7,
Line 39, replace "data from" with -- data blocks from --.
Line 47, replace "reserved from themselves" with -- reserved for themselves --.

Column 11,
Line 31, replace "times slots." with -- time slots. --.

Signed and Sealed this

Eleventh Day of October, 2005

JON W. DUDAS
*Director of the United States Patent and Trademark Office*